Patented May 16, 1939

2,158,371

UNITED STATES PATENT OFFICE 2,158,371

PARASITICIDAL CONTROL

Frank F. Lindstaedt, Oakland, Calif.

No Drawing. Application February 23, 1935,
Serial No. 7,837

12 Claims. (Cl. 167—43)

The invention relates to horticultural sprays used for killing and controlling parasitical growths, such as disclosed in my co-pending applications, Ser. No. 715,179, filed March 12, 1934; Ser. No. 730,469 and Ser. No. 730,470, each filed June 13, 1934; and Ser. No. 752,990, filed November 14, 1934.

In horticultural spray practice, as is well known, one of the leading factors in the control and killing of parasites is the quantity of spray oil applied to the plant surface. Thus, generally speaking, the heavier the deposit of the hydrocarbon or other spray oil, the higher is the percentage of parasital kill. There is, however, a limit to the deposit of oil determined by the deleterious effect of the spray on the plant itself. In certain parasitic cases, such as some obstinate growths of red scale and the like, it is necessary in order to obtain a complete kill of the parasite, to deposit an amount of oil which would kill or seriously impair the growth of the plant. In accordance with the present invention and as a principal object thereof, I have provided a horticultural spray of the character described which will cause a greater unit area deposit of oil on the parasite than on the adjacent plant surface. Thus, a desired deposit of oil may be applied to the parasites while causing a relatively lower safe deposit of oil on the plant surface.

Another object of the invention is to provide a parasiticidal control of the character described wherein by the varying of the proportion of certain auxiliary substances the quantity of oil deposit may be controlled.

A further object of the invention is to provide a parasiticidal control of the character above which will afford an oil deposit of a more lasting nature than that heretofore obtainable.

The invention possesses other objects and features of advantage, some of which, with the foregoing, will be set forth in the following description of the preferred form of the invention. It is to be understood, however, that variations in the mode of effecting the invention as explained in the description may be adapted within the scope of the invention as set forth in the claims.

As may be demonstrated, there is present on both outer surfaces of the plant life and practically all parasites a thin protective film of wax. As will be understood, this wax surface interferes with and lessens the amount of deposit and degree of penetration of the oil applied to the parasite and plant surfaces. In the case of the usual hydrocarbon spray oil there appears to be substantially no difference in the activity of the oil on the wax coverings of the plant and parasite. In accordance with the present invention, I have found that certain substances which, when combined with the oil, produce a considerably greater activity in the dissolving and adhering to the parasite wax covering than the plant wax covering. This effect is clearly visible when citrus fruits or the like having a parasite, such as red scale, thereon are sprayed with the improved spray material of my invention. In such case large droplets of the spray material draw themselves into immediate and surrounding relation over the scales, while the fruit or plant surface intermediate the scale is but lightly covered with the spray material. In other words, there appears to be a definite flow of the spray material from the surfaces between the scale into a complete globule attracted to and covering the scale. As a result, by the use of certain of the substances referred to, I may procure a deposit of several times as much oil on the parasite as compared to the adjacent plant surface. This phenomenon I have termed as selective or preferential wetting, and actual spray practice has demonstrated unusually high percentages of parasite kills with a much lower than usual deposite of spray oil.

One of the broadest classes of substances which I have found definitely produces a selective wetting is ethereal acetates. Notable in this group are normal, secondary and tertiary butyl acetate, normal and secondary amyl acetate, and normal and secondary propyl acetate. I have found in the case of spraying red scale that there is some variation in the percentage of scales covered by the droplets described above when different members of this ethereal acetate group are used. For instance, under one condition when normal amyl acetate was used, approximately 30 percent of the scale all had a substantially complete droplet of spray material attracted thereto. Tests on some of the other members of the groups showed better than 40 percent of the scales covered when secondary amyl acetate was used, 50 percent in the case of secondary butyl acetate and better than 90 percent of the scales covered when normal butyl acetate was used. Also the selective wetting is controlled to an extent by and varies with the proportion of the above substances used with the hydrocarbon oil. For example, in the case of normal butyl acetate, the selective wetting increases with the addition of the butyl acetate up to about 4 percent of the hydrocarbon oil, and is in greatest evidence between the proportions of about 2 to 4 percent.

In preparing a spray mixture using the above substances together with the hydrocarbon oil for obtaining a selective or preferential wetting, I prefer to also incorporate, as is customary in a self emulsible type of spray oil, a small percentage of an emulsifying agent. I have found that an emulsifying agent composed of sulphonated naphthenic acid and free naphthenic acid, such as set forth in my co-pending application Ser. No. 752,990 above referred to, works very well in combination with the substances used for selective wetting. Also, when such a combination is used, there is a distinct emulsifying effect and control of oil deposit afforded by the selective wetting substances. It is therefore possible under certain conditions of spraying to omit the use of any other emulsifying agent although for most spray conditions the addition of the emulsifying agent aforesaid provides an improved overall oil deposit. A typical example of a self emulsifying oil using the above ingredients comprises approximately 96 per cent hydrocarbon oil, up to approximately 4 per cent of the selective wetting substances, and up to about 2 per cent of the emulsifying agent, the latter being composed, as explained in the aforesaid copending application, of about one part sulphonated naphthenic acid to about two parts of free naphthenic acid. As will be understood, this combination is arranged to be added to water for spraying and is usually used in the proportion of about 2 per cent in the water. The effect of a quantity of ethereal acetate or selective wetting substances in the self emulsible oil on the oil deposit may be illustrated by the following figures. With substantially identical proportions of hydrocarbon oil and emulsifying agent, and under substantially identical spray conditions, variation of the quantity of normal butyl acetate, for example from 2 per cent to 4 per cent, resulted in a change of oil deposit from about 98 milligrams per hundred square inches to about 199 milligrams per hundred square inches.

I have found further that the addition of an ethereal acetate of the character set forth not only provides for a selective or preferential wetting of the parasite as described and for a means of controlling the quantity of oil deposit, but also in addition affords a more lasting oil deposit. This latter feature, as will be understood, is of considerable importance as a parasiticidal control, since it is not infrequent that the hydrocarbon oil in previous sprays would too quickly penetrate into the plant structure and leave an insufficient concentration of oil on the surface of the parasite so as to provide a complete envelopment of the parasite and choking of the latter's pores for a length of time sufficient to insure a kill. Under most conditions of spraying with the ordinary viscosities of hydrocarbon oil used, and under common conditions of temperature and weather, it is necessary to maintain a continuous film of oil over the parasite for a considerable period of time if the spray is to be effective. In order to maintain such a film over the parasite, it is desirable that the amount of oil which is absorbed in the plant structure be reduced to a minimum. This not only eliminates a common deleterious spray effect on the plant itself, but also prevents the running and drawing off of the oil from the surface of the parasite and into the plant. I have found that the inclusion of an ethereal acetate with the hydrocarbon oil is effective in maintaining an oily surface on the plant structure for and over considerably longer time than may be obtained by the use of the oil by itself. This increased duration of the oil deposited by my improved spray mixture may be concretely demonstrated by a comparison with a more or less standard spray composed of a simple mechanical mixture of oil and water with the oil in about a 2 per cent proportion to the water. Where such a standard mixture is sprayed on to a plant surface, such as for instance an orange tree growth, for say fifteen seconds and then the stem of the growth placed in water, a substantially complete disappearance of all of the oil deposited will occur in from three to five days. Where this same test is duplicated with the spray mixture of the present invention under the exact conditions of spraying, temperature, etc., there will be a detectible film present on the plant growth for twenty-five to thirty days after the stem of the growth has been placed in water.

I claim:

1. A parasiticidal control for applying to plant surfaces having parasites thereon comprising, an oleaginous mixture adapted to be added to water for spraying and including, a hydrocarbon oil, and a butyl acetate.

2. A parasiticidal control for applying to plant surfaces having parasites thereon comprising, an oleaginous mixture adapted to be added to water for spraying and including, a hydrocarbon oil, and normal butyl acetate.

3. A parasiticidal control for applying to plant surfaces having parasites thereon comprising, an oleaginous mixture adapted to be added to water for spraying and including, a hydrocarbon oil, and an amyl acetate.

4. A parasiticidal control for applying to plant surfaces having parasites thereon comprising, an oleaginous mixture adapted to be added to water for spraying and including, a hydrocarbon oil, and a propyl acetate.

5. A parasiticidal control for applying to plant surfaces comprising, an oleaginous mixture adapted to be added to water for spraying and including, approximately 98 per cent hydrocarbon oil, up to about 2 per cent emulsifier composed of sulphonated naphthenic acid and free napththenic acid in the proportion of approximately one part of the former to two parts of the latter, and approximately 4 per cent normal butyl acetate.

6. A parasiticidal control comprising, a hydrocarbon oil, and an ethereal acetate of the lower alkyl group consisting of propyl and butyl and amyl acetate.

7. In a horticultural parasiticidal control the combination of, a hydrocarbon oil, and a butyl acetate.

8. In a horticultural parasiticidal control the combination of, a hydrocarbon oil, and an amyl acetate.

9. In a horticultural parasiticidal control the combination of, a hydrocarbon oil, and a propyl acetate.

10. In a horticultural parasiticidal control the combination of, a hydrocarbon oil, and secondary amyl acetate.

11. In a horticultural parasiticidal control the combination of, a hydrocarbon oil, and normal propyl acetate.

12. A parasiticidal control comprising, a hydrocarbon oil, and an ethereal acetate of the lower alkyl group consisting of propyl and butyl and amyl acetate in the proportion of up to approximately 4 per cent of said oil.

FRANK F. LINDSTAEDT.